(12) United States Patent
Nixdorf et al.

(10) Patent No.: US 10,590,861 B2
(45) Date of Patent: Mar. 17, 2020

(54) POWER PLANT WITH EMERGENCY FUEL SYSTEM

(71) Applicant: Siemens Aktiengesellschaft, Munich (DE)

(72) Inventors: Manfred Nixdorf, Mutterstadt (DE); Karl-Heinz Persicke, Niederdorfelden (DE); Wilhelm Thiele, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 15/329,360

(22) PCT Filed: Aug. 13, 2015

(86) PCT No.: PCT/EP2015/068670
§ 371 (c)(1),
(2) Date: Jan. 26, 2017

(87) PCT Pub. No.: WO2016/023987
PCT Pub. Date: Feb. 18, 2016

(65) Prior Publication Data
US 2018/0209353 A1    Jul. 26, 2018

(30) Foreign Application Priority Data

Aug. 13, 2014   (DE) .................. 10 2014 216 014

(51) Int. Cl.
*F02C 3/22*      (2006.01)
*F02C 9/46*      (2006.01)
(Continued)

(52) U.S. Cl.
CPC ............... *F02C 9/46* (2013.01); *F01D 15/10* (2013.01); *F02C 3/22* (2013.01); *F02C 7/141* (2013.01);
(Continued)

(58) Field of Classification Search
CPC .... F02C 3/22; F02C 6/14; F25J 1/0022; F25J 1/0228
See application file for complete search history.

(56) References Cited

U.S. PATENT DOCUMENTS 3,735,600 A * 5/1973 Dowdell ................ F25J 1/0282
62/619
6,367,258 B1 * 4/2002 Wen .......................... F02C 3/22
60/641.1
(Continued)

FOREIGN PATENT DOCUMENTS

EP          0828925 B1      3/2004
EP          1519115 A2      3/2005
(Continued)

OTHER PUBLICATIONS

IPPR (PCT/IPEA/416 and 409) dated Nov. 23, 2016, for PCT patent application No. PCT/EP2015/056670.
(Continued)

*Primary Examiner* — Gerald L Sung
(74) *Attorney, Agent, or Firm* — Beusse Wolter Sanks & Maire

(57) ABSTRACT

A method for operating a power plant having a gas turbine and an emergency fuel system where in a normal operating state, gas is supplied from a supply line to the combustion process of the gas turbine, and in addition gas is supplied from the supply line to a gas liquefaction plant where it is liquefied, forming a liquid gas which is stored in a liquid gas store. In special operating state, liquefied gas is drawn from the liquid gas store and is evaporated in an evaporator, and is fed in the gaseous state into the combustion process of the gas turbine.

9 Claims, 3 Drawing Sheets

(51) Int. Cl.

| | | |
|---|---|---|
| *F01D 15/10* | (2006.01) | |
| *F25J 1/00* | (2006.01) | |
| *F25J 1/02* | (2006.01) | |
| *F23R 3/36* | (2006.01) | |
| *F02C 7/224* | (2006.01) | |
| *F02C 7/232* | (2006.01) | |
| *F02C 7/141* | (2006.01) | |

(52) U.S. Cl.
CPC .............. *F02C 7/224* (2013.01); *F02C 7/232* (2013.01); *F23R 3/36* (2013.01); *F25J 1/0022* (2013.01); *F25J 1/023* (2013.01); *F25J 1/0251* (2013.01); *F05D 2220/72* (2013.01); *F05D 2220/76* (2013.01); *F05D 2230/80* (2013.01); *F05D 2270/053* (2013.01); *F05D 2270/09* (2013.01); *F05D 2270/335* (2013.01); *Y02E 20/16* (2013.01)

(56) References Cited

U.S. PATENT DOCUMENTS

| | | | |
|---|---|---|---|
| 6,374,591 | B1 | 4/2002 | Johnson et al. |
| 7,380,402 | B2* | 6/2008 | Rebhan .................. F02C 3/22 60/39.463 |
| 2004/0136784 | A1* | 7/2004 | Dahlem ................. E21B 43/12 405/52 |
| 2005/0091991 | A1* | 5/2005 | Roldan Villalobos ...................... F25J 1/0007 62/48.3 |
| 2005/0126178 | A1 | 6/2005 | Rebhan et al. |
| 2006/0185367 | A1* | 8/2006 | Hino ........................ F02C 7/14 60/772 |
| 2011/0094242 | A1* | 4/2011 | Koerner .................. F02C 3/22 60/780 |
| 2013/0247578 | A1 | 9/2013 | Deuker et al. |
| 2013/0305738 | A1* | 11/2013 | Hughes .................. F02C 3/22 60/780 |
| 2014/0000275 | A1* | 1/2014 | Kesseli .................. F02C 7/22 60/776 |
| 2017/0059212 | A1* | 3/2017 | Giardinella ............... F02C 6/14 |
| 2018/0163628 | A1* | 6/2018 | Vandervort ............ F02C 7/224 |

FOREIGN PATENT DOCUMENTS

| | | |
|---|---|---|
| EP | 1655456 A2 | 5/2006 |
| JP | S5423123 A | 2/1979 |
| JP | 5423123 B2 | 8/1979 |
| JP | 2002195055 A | 7/2002 |
| JP | 2013545022 A | 12/2013 |
| WO | 2013135691 A1 | 9/2013 |

OTHER PUBLICATIONS

DE Search Report dated May 30, 2016, for DE patent application No. 102014216014.6.
International Search Report dated Nov. 16, 2015, for PCT patent application No. PCT/EP2015/056670.

* cited by examiner

POWER PLANT WITH EMERGENCY FUEL SYSTEM

CROSS REFERENCE TO RELATED APPLICATIONS

This application is the US National Stage of International Application No. PCT/EP2015/068670 filed Aug. 13, 2015, and claims the benefit thereof. The International Application claims the benefit of German Application No. DE 102014216014.6 filed Aug. 13, 2014. All of the applications are incorporated by reference herein in their entirety.

FIELD OF INVENTION

The invention relates to a method for operating a power plant, to a method for retrofitting an emergency fuel system into an existing power plant, and to a power plant having an emergency fuel system.

BACKGROUND OF INVENTION

In order to ensure the operation of power plants even in the event of failure of the primary fuel, secondary fuels are stored as emergency fuel in the proximity of the power plant in order to be able to continue to operate the power plant in for example an emergency operating state when need arises. Depending on design of the power plant and demands from the electricity supply network it may be necessary for the power plant to be required to have the capability of being operated in the emergency operating state using a secondary fuel for between 7 and 14 days.

In the case of combined gas and steam power plants (CCPP), gas, especially natural gas, which is directed to the power plant via a supply line, such as pipelines, is used as primary fuel. Oil (diesel), which is stored in tanks on the site of the power plant, is as a rule used as secondary fuel. If a failure of the gas supply via the supply line occurs, a switch can be made to oil as secondary fuel. In order to be able to store oil in sufficient quantities, access to supply logistics is necessary.

In order to be able to combust oil in the gas turbine, additional burners are required in the gas turbine, which makes the development of such a gas turbine more expensive. By the same token, additional auxiliary systems, such as pumps and measurement and control systems, are required on the gas turbine. Also, large tanks are required on the site of the power plant.

Oil as secondary fuel in addition to gas as primary fuel has a number of disadvantages. In particular, oil has a lower level of efficiency compared with gas when being combusted in the gas turbine since lower flame temperatures can be achieved using oil. This leads to a significant power reduction during firing with oil. Therefore, such a power plant has to be of larger design in order to be able to achieve total rated power even during emergency operation.

The operating stability when using oil as fuel is also lower than in the case of gas. Also, if the power is lower as a result of firing with oil, the emissions increase when firing with oil. This, depending on local environmental regulations, necessitates an additional catalyst. Using oil as secondary fuel, regulatory authorizations therefore also increase.

One of the most problematic disadvantages during operation, however, is that a relatively long changeover period is required for switching from gas to oil. Consequently, oil as emergency fuel is suitable particularly only for scheduled outages. In the case of sudden failures the power plant would have to be run down, depending on gas turbine type.

SUMMARY OF INVENTION

It is an object of the invention to eliminate the disadvantages from the prior art. In this case, a costly extension of the gas turbine for a secondary fuel is to be dispensed with, no power losses are to arise during emergency fuel operation, and the power plant is also to be able to continue to be operated without interruption even in the event of sudden failures of the primary gas fuel. In addition, it is an object of the invention to specify a method for operating a power plant having an emergency fuel system, to specify a power plant having an emergency fuel system, and to specify a method for retrofitting an emergency fuel system into an existing power plant.

An object of the invention which is directed toward a method for operating a power plant having an emergency fuel system is achieved by the features of the independent claim, wherein the power plant comprises a gas turbine and an emergency fuel system, and can be operated in a normal operating state and in a special operating state. In the normal operating state, gas is fed from a supply line to the combustion process of the gas turbine, and, in addition, gas is fed from the supply line to a gas liquefaction plant and liquefied therein, wherein a liquefied gas (LNG) is formed and stored in a liquefied gas tank. In the special operating state, liquefied gas (LNG) is extracted from the liquefied gas tank and evaporated in an evaporator, and in a gaseous state is fed into the combustion process of the gas turbine.

In the normal operating state, the power plant is supplied from the outside with gas, such as natural gas, via a supply line, such as a pipeline, and operated for power generation and/or district heat generation. Some of the gas from the supply line is also fed to a gas liquefaction plant (liquefier) in the normal operating state, where with the aid of compression energy from the supply line it is liquefied by means of an integrated expansion turbine. The gas liquefaction plant comprises a compressor station and also "liquefier-cryogenic" apparatus which are interconnected in such a way that the gas is compressed and cooled in a number of stages. The liquefied gas, which is also referred to as Liquefied Natural Gas (LNG), is stored in a liquefied gas tank. Storage can be carried out cryogenically under pressure or under atmospheric pressure.

The special operating state is a scheduled or sudden outage of the gas supply from the supply line, during which no gas, insufficient gas, or only gas in fluctuating mass flows is available for the gas turbine from the supply line. Sharp fluctuations in the quality of the gas from the supply line can also define the special operating state. In these cases, liquefied gas is extracted from the liquefied gas tank and fed to an evaporator. In the evaporator, the liquefied gas is again converted into the gas phase. If storage of the liquefied gas (LNG) is carried out at atmospheric pressure, the gas has to be brought up again to the pressure which is required for the gas turbine. To this end, an additional pump is required.

On the one hand, the invention is based on the consideration that a secondary fuel as emergency fuel is dispensed with by the main fuel being stored. The emergency fuel corresponds to the primary fuel. On the other hand, the emergency fuel is stored as liquefied gas (LNG) which is created during normal operation. In this way, the emergency fuel system constitutes an energy store which enables decoupling of gas procurement and power generation demand.

Since in the special operating state the same gas is used as emergency fuel, as in the normal operating state, no power losses arise in the special operating state. On the contrary, a power increase can even be achieved. The liquefied gas (LNG) is of higher quality than the gas from the supply line since inert gas components such as nitrogen or carbon dioxide and contaminants are removed during liquefied gas production. If fluctuations of the composition or of the quality of the gas from the supply line occur, a switch can be made to the special operating state, and the gas turbine can continue to be operated with high-quality liquefied gas (LNG). Consequently, the operating reliability of the power plant is increased. Moreover, as a result of the high-quality fuel, the invention of the power plant makes it possible to control its output within a higher control range.

As a result of the invention, expensive secondary fuel burners do not need to be installed in the gas turbine. The main burners can also be used for the emergency fuel since this is also gas. The operational, regulatory and logistical handling of the emergency fuel is dispensed with since reserves can be formed using the main fuel.

Due to the capability of storing main fuel, the power plant operator can achieve better cost positions when buying in gas since the gas supplier does not have to guarantee supply outages.

The power plant can continue to be operated without interruption even in the event of sudden failures of the primary fuel from the supply line since the stored liquefied gas is indeed integrated by system technology in the gas supply system of the entire plant, and switching the gas turbine from main fuel to emergency fuel is therefore possible without any problem during continuous operation. Due to the invention, the availability of a power plant during special operation using emergency fuel is therefore no longer directly coupled with the availability of the gas supply system and could be significantly increased.

In an advantageous further development of the method, evaporated gas is fed from the tank back into the supply line in the special operating state. As a result, the power plant operator can contribute to either compensating pressure fluctuations in the supply line, or, in the case of a complete supply failure, to supply other connected consumers, which are also affected by the supply failure, with gas. This enables additional revenues for the power plant operator.

Since the gas liquefaction plant is inoperative comparatively briefly, the compressor and cooler can be operated with electric current which is generated in the power plant. The power plant installation according to the invention is delimited as a result by just LNG plants with associated power plant since in these the gas liquefaction plants are driven by means additional gas turbines. In the invention, the gas liquefaction plant is advantageously dimensioned so that less than 5% of the electric power of the power plant is used for liquefaction of the gas. The gas liquefaction plant according to the invention is designed so that with regard to the overall gas consumption of the gas turbine it draws off and liquefies only a small proportion. This small proportion customarily corresponds to less than 5% and in the main depends on the required operating times during reserve operation and on gas quality.

In a further advantageous further development of the invention, the gas liquefaction plant is additionally used in the normal operating state in order to utilize power control of the power plant by controlled start-up or shutdown of said gas liquefaction plant. The power control in this case can also be utilized in some circumstances for frequency control or frequency back-up. The gas liquefaction plant corresponds to a consumer, which only runs in the normal operating state, and can be shut down without any problem. By means of a controlled shutdown, the power which the gas liquefaction plant consumes can therefore be fed into the electricity supply network and therefore contribute to the power control of the power plant.

In a particular embodiment of the invention, in the special operating state the cold energy which becomes free during evaporation in the evaporator is used for cooling the intake air of the gas turbine, in which the evaporated gas is conducted with the intake air in the heat exchanger. The cold energy of the re-evaporating gas can in this case be transferred directly, or by means of a heat transfer medium, to the intake air of the gas turbine. By re-evaporation of the cryogenically stored fuel and utilization of the cold energy which becomes free in the process, the output of the gas turbine during peak load operation can therefore be further increased. Depending on design of the power plant and environmental conditions, an increase of the unit capacity by between 5 and 10% is possible, depending on plant type and precooling processes. Cooling of the intake air can also be carried out in a controlled manner so that in the special operating state using emergency fuel the operating flexibility of the power plant can be increased.

An object of the invention which is directed toward a method for retrofitting an emergency fuel system is achieved by the feature described herein. In this case, in an existing power plant, which comprises a gas turbine, a gas liquefaction plant, a liquefied gas tank and an evaporator are retrofitted. The gas liquefaction plant is connected in a gas-feeding manner to a supply line (pipeline) and for the output of liquefied gas (LNG) is connected to the liquefied gas tank. The liquefied gas tank is connected to the evaporator for the output of liquefied gas (LNG), and the evaporator is connected to the gas feed line of the combustion process of the gas turbine for the output of evaporated gas.

As a result, in the case of retrofitting a power plant with an emergency fuel system, no additional EIA (Environmental Impact Assessment) and no new approval for a new fuel are necessary with the environmental authorities, which significantly minimizes the risk of a scheduled retrofit. No fuel change takes place.

An object of the invention which is directed toward a power plant is achieved by the features described herein. The power plant comprises a gas turbine, a gas liquefaction plant, a liquefied gas tank for storing liquefied gas (LNG), and an evaporator. The gas turbine and the gas liquefaction plant are connected to a supply line. The liquefied gas which can be produced in the gas liquefaction plant can be fed to the liquefied gas tank. The liquefied gas which is stored in the liquefied gas tank can be fed to the evaporator. According to the invention, evaporated gas from the evaporator or gas from the supply line can be selectively fed to the gas turbine.

Consequently, gas can be fed from the supply line to the gas turbine in the normal operating state, and in the special operating state, in the event of failure of the supply line, gas can be fed from the evaporator to the gas turbine. The advantages according to the invention ensue similarly to the method for operating a power plant having an emergency fuel system described herein.

In a further development of the invention, the evaporator is connected to the supply line so that liquefied gas can be directed into the supply line after re-evaporation. As a result, the power plant can feed back gas into the supply line.

In a further advantageous embodiment of the invention, the power plant also comprises an electric drive which drives the gas liquefaction plant. The power absorption of the electric drive is in this case less than 5% of the electric power of the power plant. Alternatively to this, the gas liquefaction plant can also be driven by means of the existing gas turbine or by means of an additional gas turbine, which in comparison to an electric drive has cost and availability advantages, depending on design of the power plant.

In a particular further development of the power plant, inclusion is also made for a control device which starts up or shuts down the gas liquefaction plant in a controlled manner. Controlling occurs in this case in dependence upon a power which is demanded by the power plant. Consequently, power control of the power plant can be achieved especially for frequency control or frequency back-up.

In a further particular embodiment of the invention, the power plant also comprises a compressor unit which extracts the re-evaporation enthalpy from the ambient air of the gas turbine. A heat exchanger is connected in a feeding manner by its secondary side to the evaporator, and by its primary side is connected in a feeding manner to the intake air feed of the gas turbine. As a result, the cold energy of the liquefied gas (LNG) can be used during evaporation for cooling of the intake air of the gas turbine. The secondary side is the side to which heat is transferred from the primary side.

The invention can be advantageously used in gas and steam turbine plants, in gas turbine plants or in combined heat and power plants.

BRIEF DESCRIPTION OF THE DRAWINGS

Exemplary embodiments of the invention are described below based on figures. In the drawings.

DETAILED DESCRIPTION OF INVENTION

Figure 1:
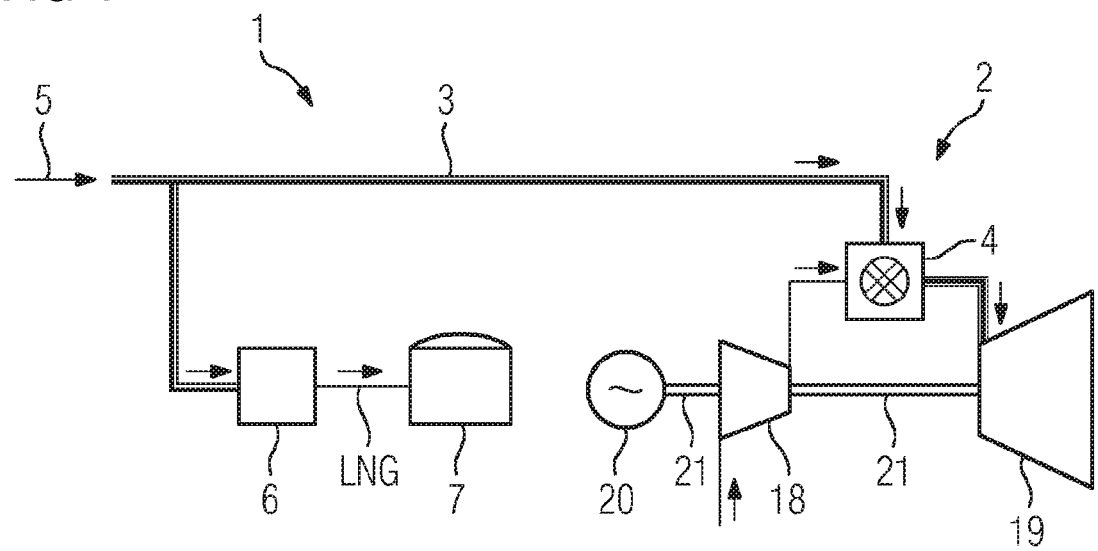
FIG. 1 shows a method for operating a power plant in the normal operating state.

FIG. 1 shows a method for operating a power plant 1 in the normal operating state. In this normal operating state, a gas 5 is fed from a supply line 3 to a combustion process 4 of a gas turbine 2. The gas turbine comprises a compressor unit 18, the combustion process 4, and an expansion unit 19. Gas 5 is fed from the supply line 3 to the combustion process 4.

In addition to the combustion process 4, gas 5 is also fed from the supply line 3 to a gas liquefaction plant 6. The gas 5 is liquefied in the gas liquefaction plant 6, wherein a liquefied gas (LNG) is formed. The liquefied gas (LNG) is stored in a liquefied gas tank 7. The liquefied gas tank corresponds to a tank which is designed so that the liquefied gas (LNG) can be cryogenically stored in it. In the present exemplary embodiment, the tank has a storage volume of 30T m$^3$.

With this, in the special operating state an operation of the gas turbine 2 would be possible for up to 14 days even in the event of failure of the supply line 3. In the present example, the gas liquefaction plant 6 has a throughput volume of 1.7 kg/s. Therefore, it is in a position to fully fill up the liquefied gas tank 7 within a year in the normal operating state of the power plant 1.

Figure 2:
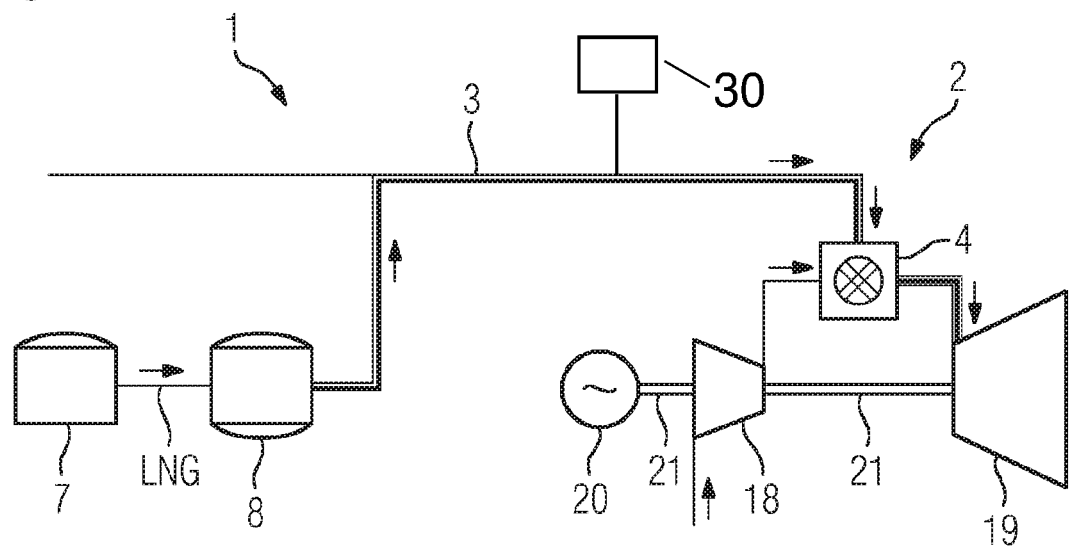
FIG. 2 shows a method for operating a power plant in the special operating state.

FIG. 2 shows a method for operating a power plant 1 in the special operating state in which no gas 5 is available from the supply line 3. In order to be able to continue to supply the combustion process 4 of the gas turbine 2 with gas, liquefied gas (LNG) is extracted from the liquefied gas tank 7 and fed to an evaporator 8. In the evaporator 8, the liquefied gas (LNG) is evaporated and in the vaporous state is fed to the combustion process 4 of the gas turbine 2. In the event of a complete loss of supply gas, the evaporated gas may also be supplied to other consumers 30 connected to the supply line 3.

In the example of FIG. 2, the liquefied gas tank 7 is a pressurized tank. The pressure at which the liquefied gas (LNG) is stored is in this case set so that the pressure of the gas after evaporating in the evaporator 8 is at such a level that it corresponds to the required pressure for the gas turbine 2.

Not shown in FIG. 2 is an alternative variant in which use is made of a liquefied gas tank 7 in which the liquefied gas (LNG) is stored under atmospheric pressure. In this case, it is necessary to increase the pressure of the gas before feeding it into the combustion process 4 of the gas turbine 2. This is achieved by means of a pump which is arranged between liquefied gas tank 7 and evaporator 8.

Figure 3:
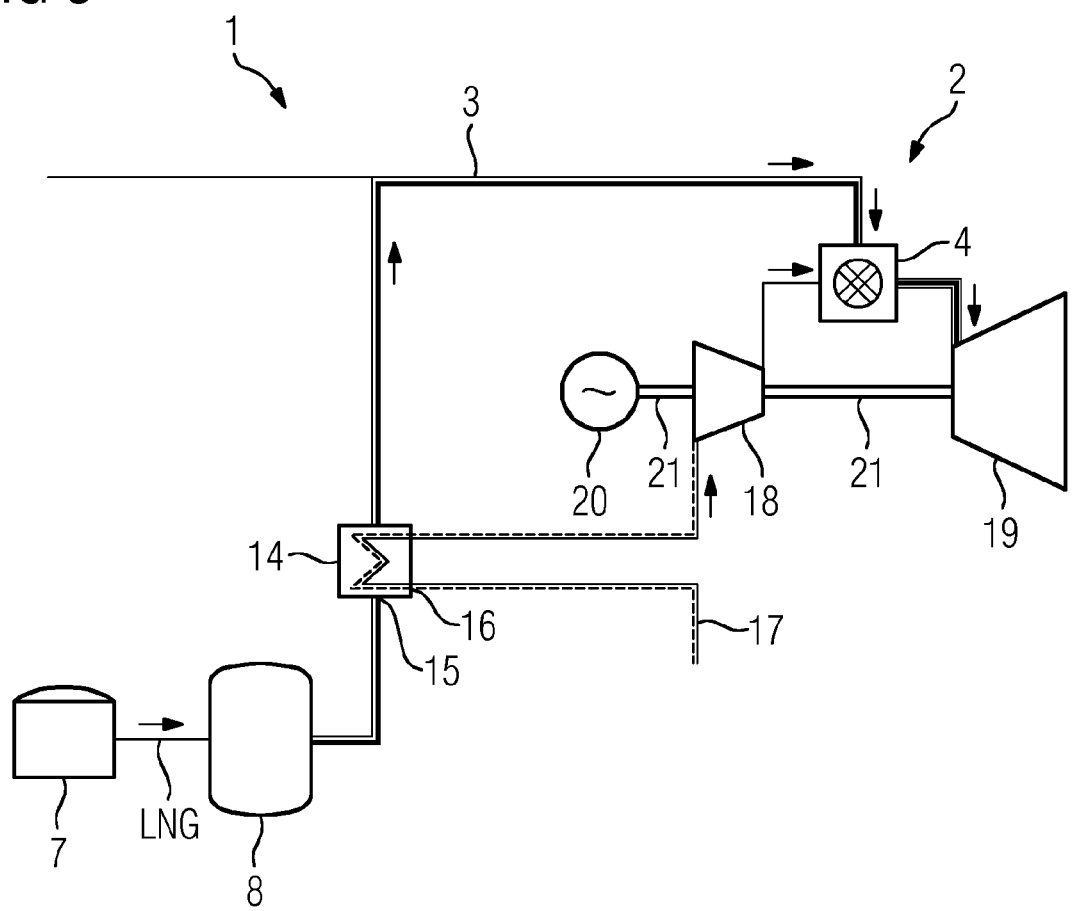
FIG. 3 shows a particular further development of the method for operating a power plant in the special operating state.

FIG. 3 shows a particular further development of the method for operating a power plant in the special operating state. In the exemplary embodiment of FIG. 3, provision is also made for a heat exchanger 14 which has a primary side 16 and a secondary side 15. The primary side 16 is the side which releases heat and the secondary side 15 is the side which absorbs heat. The heat exchanger 14 is connected in a feeding manner by its secondary side 15 to the evaporator 8. On the secondary side, the heat exchanger is connected in a discharging manner to the supply line 3 via which the gas can be fed to the combustion process 4 of the gas turbine 2. On the primary side 16, the heat exchanger 14 is connected into the intake air line 17. As a result, cold energy which becomes free during evaporation of liquefied gas in the evaporator 8 can be used for cooling the intake air of the gas turbine 2.

Figure 4:
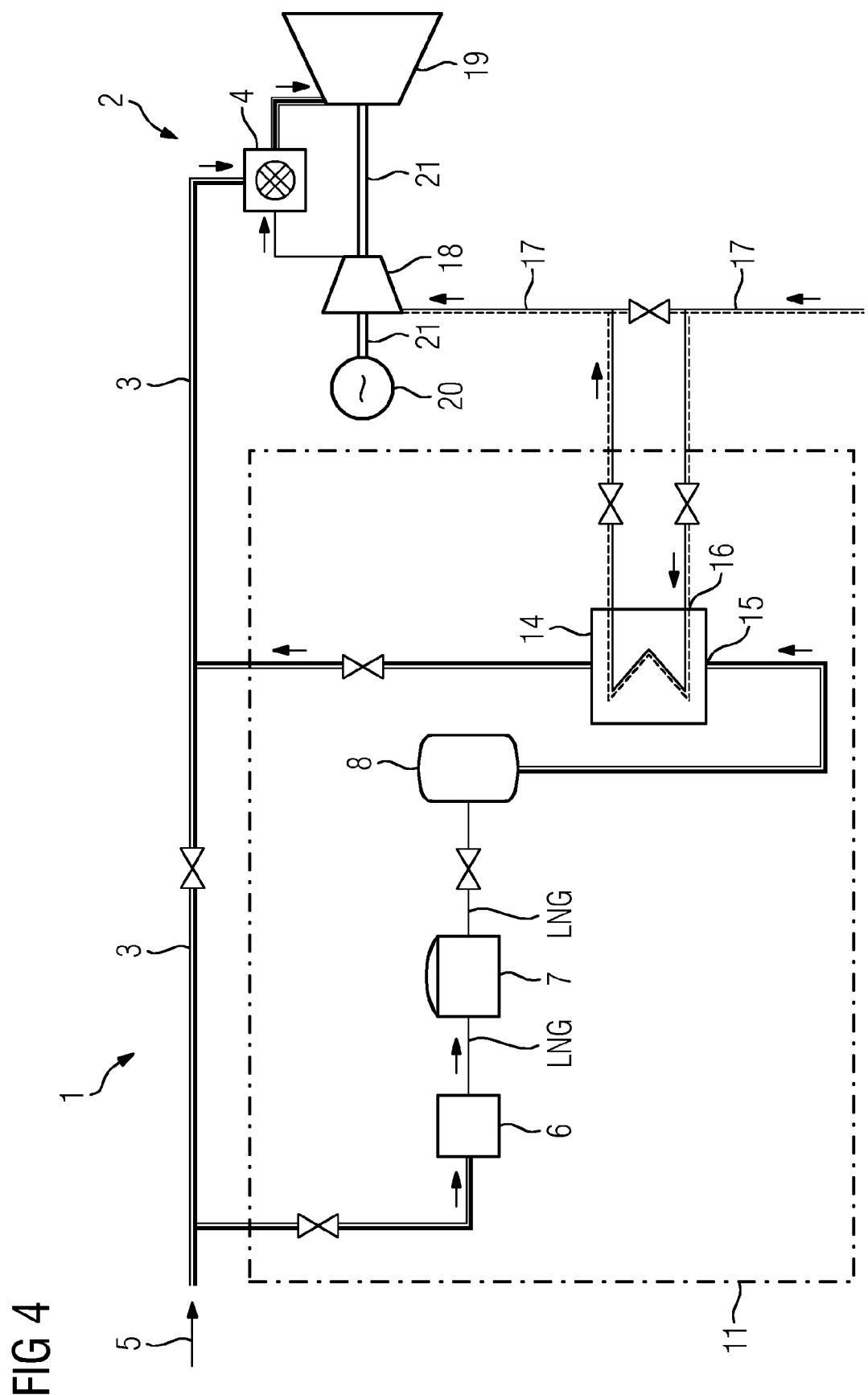
FIG. 4 shows a way how an existing power plant can be extended with an emergency fuel system.

FIG. 4 on the other hand shows a way how an existing power plant 1 can be extended with an emergency fuel system 11, and also shows a power plant 1 which is retrofitted with an emergency fuel system 11. The emergency fuel system 11 comprises a gas liquefaction plant 6, a liquefied gas tank 7, an evaporator 8, and a heat exchanger 14. The emergency fuel system 11 is integrated in a power plant which has a gas turbine 2.

The gas liquefaction plant 6 is connected in a feeding manner to the supply line 3, wherein a control valve can be integrated into the connecting line in order to control the proportion of gas for the gas liquefaction plant 6. The gas liquefaction plant 6 is connected to the liquefied gas tank 7 via a line for liquefied gas. The liquefied gas tank 7 is connected via a connecting line for liquefied gas to the evaporator 8, wherein a control valve is connected into the connecting line. The liquefied gas tank 7 which is shown here is a pressurized tank which is why no subsequent pressure increase of the re-evaporated gas is required.

Not shown is an alternative variant of the liquefied gas tank 7 which is operated at atmospheric pressure and in which provision has to be made for an additional pump in order to bring the liquefied gas up to the pressure level of the gas supply line again. The pump in this case is advantageously provided between the liquefied gas tank 7 and the evaporator 8.

The evaporator 8 is connected in a feeding manner to the secondary side 15 of the heat exchanger 14. The secondary side of the heat exchanger 14 is connected in a discharging manner to the supply line 3, wherein a control valve is connected into this connecting line. The heat exchanger 14 is connected on the primary side into the intake air line 17 of the compressor unit 18 of the gas turbine, wherein the feed and discharge lines to the heat exchanger are equipped in each case with control valves.

A power plant 1, which according to this method is retrofitted with, or equipped with, an emergency fuel system 11, has the capability of selectively operating the gas turbine 2 with gas from the supply line 3 or with evaporated gas from the emergency fuel system.

The invention claimed is:

1. A method for operating a power plant comprising a gas turbine and an emergency fuel system, the method comprising:
   receiving into a supply line a supply gas from an external source, wherein the supply line is connected to a combustion process of the gas turbine, and wherein the supply line comprises a liquefaction process outlet,
   a liquefaction line connected to a gas liquefaction plant and comprising a liquefaction line inlet connected to the liquefaction process outlet,
   in a first operating state, feeding the supply gas from the supply line to the combustion process of the gas turbine, and, in addition, feeding the supply gas from the liquefaction process outlet to the liquefaction line to supply the gas liquefaction plant and liquefying the supply gas therein, wherein a composition of the supply gas is not changed, wherein a liquefied gas is formed and stored in a liquefied gas tank,
   in a second operating state, extracting the liquefied gas from the liquefied gas tank, and evaporating the liquefied gas in an evaporator to form an evaporated gas, and feeding the evaporated gas into the combustion process of the gas turbine, and
   in the second operating state, feeding the evaporated gas from the liquefied gas tank back into the supply line in order to compensate for pressure fluctuations in the supply line or, in the event of a complete loss of supply gas, to supply other consumers which are connected to the supply line with the evaporated gas.

2. The method as claimed in claim 1,
   wherein, in the gas liquefaction plant, less than 5% of electric power of the power plant is used for liquefaction of the supply gas.

3. The method as claimed in claim 1,
   wherein, in the second operating state, cold energy which becomes free during evaporation in the evaporator is used for cooling intake air of the gas turbine.

4. The method as claimed in claim 1,
   wherein the gas liquefaction plant is additionally used in the first operating state in order to utilize power control of the power plant by controlled start-up or shutdown of said gas liquefaction plant.

5. The method as claimed in claim 4,
   wherein the gas liquefaction plant is additionally used in the first operating state for frequency control or frequency back-up.

6. The method as claimed in claim 1, wherein the supply gas fed to the combustion process of the gas turbine comprises liquefied natural gas, and the supply gas fed to the gas liquefaction plant comprises the liquefied natural gas.

7. The method as claimed in claim 1, wherein the supply gas from the external source, the supply gas fed to the combustion process of the gas turbine, and the supply gas fed to the gas liquefaction plant comprise liquefied natural gas.

8. A method for operating a power plant comprising a gas turbine and an emergency fuel system, the method comprising:
   feeding supply gas from an external source to a combustion process of the gas turbine in a first operating state,
   feeding a flow of the supply gas from the external source to a gas liquefaction plant without changing a composition of the flow of the supply gas therebetween, liquefying the supply gas in the gas liquefaction plant to form a liquefied gas, and storing the liquefied gas in a liquefied gas tank in the first operating state, and
   extracting the liquefied gas from the liquefied gas tank, evaporating the liquefied gas in an evaporator to form an evaporated gas, and feeding the evaporated gas into the combustion process of the gas turbine in a second operating state,
   wherein in the first operating state the power plant is supplied with supply gas from the external source, and
   wherein in the second operating state the evaporated gas is fed back into a supply line that leads to the combustion process.

9. The method as claimed in claim 8, wherein the supply gas is fed from the external source to a supply line, and wherein the supply line branches into a combustion line that supplies the supply gas to the combustion process and into a liquefaction line that supplies the supply gas to the gas liquefaction plant.

* * * * *